(12) United States Patent
D'Souza et al.

(10) Patent No.: US 11,080,182 B2
(45) Date of Patent: Aug. 3, 2021

(54) OBJECT LOAD INTROSPECTION USING GUARDED STORAGE

(71) Applicant: INTERNATIONAL BUSINESS MACHINES CORPORATION, Armonk, NY (US)

(72) Inventors: Irwin D'Souza, Toronto (CA); Joran S. C. Siu, Thornhill (CA); Filip Jeremic, Hamilton (CA); Aleksandar Micic, Ottawa (CA); Evgenia Badiyanova, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 35 days.

(21) Appl. No.: 16/241,157

(22) Filed: Jan. 7, 2019

(65) Prior Publication Data
US 2020/0218651 A1 Jul. 9, 2020

(51) Int. Cl.
*G06F 12/02* (2006.01)
*G06F 12/14* (2006.01)
(Continued)

(52) U.S. Cl.
CPC ........ *G06F 12/0253* (2013.01); *G06F 9/4812* (2013.01); *G06F 9/4843* (2013.01);
(Continued)

(58) Field of Classification Search
None
See application file for complete search history.

(56) References Cited

U.S. PATENT DOCUMENTS 6,925,639 B2 * 8/2005 Tarditi .................... G06F 8/441
717/153
7,313,566 B1 * 12/2007 Printezis ............. G06F 12/0269
(Continued)

OTHER PUBLICATIONS

Cazzola, "SmartReflection: Efficient Introspection in Java", http://www.jot.fm/issues/issue_2004_12/article6, Journal of Object Technology, vol. 3, No. 11, Special issue: OOPS track at SAC 2004, Nicosia/Cyprus, pp. 117-132, Dec. 2004, 16 pages.
(Continued)

*Primary Examiner* — Sean D Rossiter
*Assistant Examiner* — Stephanie Wu
(74) *Attorney, Agent, or Firm* — Michael O'Keefe; Andrew D. Wright; Roberts Calderon Safran & Cole, P.C.

(57) ABSTRACT

Systems and methods for object load introspection using guarded storage are disclosed. In embodiments, a computer-implemented method includes: determining objects of interest designated by a user; splitting a first subset of a predetermined memory heap into guarded regions based on a number of objects of interest; allocating each of the objects of interest to a respective one of the guarded regions and remaining objects to a second subset of the predetermined memory heap; executing a program; detecting one of the objects of interest is loaded from one of the guarded regions; generating a trap that transfers control of the executing the program to a signal handler, wherein the signal handler is designated to perform a user-defined task associated with the one of the objects of interest; and executing, by the signal handler of the computing device, the user-defined task.

17 Claims, 3 Drawing Sheets

(51) Int. Cl.
   *G06F 9/50* (2006.01)
   *G06F 9/48* (2006.01)
   *G06F 9/30* (2018.01)
(52) U.S. Cl.
   CPC .......... *G06F 9/5016* (2013.01); *G06F 12/145* (2013.01); *G06F 9/30043* (2013.01)

(56) References Cited

U.S. PATENT DOCUMENTS

| | | | |
|---|---|---|---|
| 7,840,856 B2 | 11/2010 | Apte et al. | |
| 8,566,812 B1* | 10/2013 | Printezis | G06F 9/45558 |
| | | | 717/158 |
| 8,725,974 B2* | 5/2014 | Dice | G06F 12/0253 |
| | | | 711/152 |
| 9,027,011 B1* | 5/2015 | Lam | G06F 9/44505 |
| | | | 717/158 |
| 9,207,920 B2 | 12/2015 | O'Boyle et al. | |
| 2004/0030912 A1* | 2/2004 | Merkle, Jr. | G06F 21/10 |
| | | | 726/26 |
| 2004/0078381 A1* | 4/2004 | Blandy | G06F 12/0269 |
| 2004/0133777 A1* | 7/2004 | Kiriansky | G06F 21/53 |
| | | | 713/166 |
| 2004/0221120 A1* | 11/2004 | Abrashkevich | G06F 12/023 |
| | | | 711/170 |
| 2005/0268273 A1* | 12/2005 | Fresko | G06F 8/458 |
| | | | 717/100 |
| 2006/0143227 A1 | 6/2006 | Helm et al. | |
| 2008/0046668 A1* | 2/2008 | Newburn | G06F 9/30003 |
| | | | 711/154 |
| 2009/0327659 A1* | 12/2009 | Fresko | G06F 11/3636 |
| | | | 712/208 |
| 2010/0088705 A1* | 4/2010 | Attinella | G06F 12/1441 |
| | | | 718/102 |
| 2010/0106926 A1* | 4/2010 | Kandasamy | G06F 11/366 |
| | | | 711/163 |
| 2011/0041105 A1* | 2/2011 | Chou | G06F 13/28 |
| | | | 716/106 |
| 2011/0119445 A1* | 5/2011 | Gooding | G06F 15/17381 |
| | | | 711/122 |
| 2011/0219208 A1* | 9/2011 | Asaad | G06F 15/76 |
| | | | 712/12 |
| 2013/0185740 A1* | 7/2013 | Mitsuyu | G06F 9/54 |
| | | | 719/320 |
| 2014/0033183 A1* | 1/2014 | Brown | G06F 11/3636 |
| | | | 717/131 |
| 2017/0371573 A1* | 12/2017 | Kim | G06F 3/0622 |
| 2018/0075236 A1* | 3/2018 | Kwon | G06F 21/554 |
| 2019/0073473 A1* | 3/2019 | VanderLeest | G06F 21/554 |

OTHER PUBLICATIONS

D'Souza, "How Concurrent Scavenge using the Guarded Storage Facility Works", https://developer.ibm.com/iavasdk/2017/09/25/concurrent-scavenge-using-guarded-storage-facility-works/, IBM.com, Sep. 25, 2017, 3 pages.

D'Souza, "Reducing Garbage Collection pause times with Concurrent Scavenge and the Guarded Storage Facility", https://developer.ibm.com/javasdk/2017/09/18/reducing-garbage-collection-pause-times-concurrent-scavenge-guarded-storage-facility/,IBM.com, Sep. 18, 2017, 2 pages.

Anonymous, "Instruction set architecture", https://en.wikipedia.org/wiki/Instruction_set_architecture#Instructions, Wikipedia, accessed Oct. 24, 2018, 10 pages.

* cited by examiner

OBJECT LOAD INTROSPECTION USING GUARDED STORAGE

BACKGROUND

The present invention relates generally to object introspection and, more particularly, to object load introspection using guarded storage.

A guarded storage (GS) facility is a feature of a computing device that allows a program to guard regions in memory such that performing a guarded load of a reference to that region triggers a user-defined interrupt handler or signal handler. The GS facility enables enterprise scale Java applications to be run with shorter periodic pauses, thus reducing program pauses during Java garbage collection. Java is a general-purpose programing language that is concurrent, class-based, object-oriented, and designed to produce programs that will run on any computer system. Java uses an automatic garbage collector that manages memory in an object lifecycle. Other Java-like programming languages exist that also utilize automatic garbage collection.

SUMMARY

In an aspect of the invention, a computer-implemented method includes: determining, by a computing device, objects of interest designated by a user; splitting, by the computing device, a first subset of a predetermined memory heap into guarded regions based on a number of objects of interest; allocating, by the computing device, each of the objects of interest to a respective one of the guarded regions and remaining objects to a second subset of the predetermined memory heap; executing, by a computing device, a program; detecting, by the computing device, one of the objects of interest is loaded from one of the guarded regions; generating, by the computing device, a trap that transfers control of the executing the program to a signal handler, wherein the signal handler is designated to perform a user-defined task associated with the one of the objects of interest; and executing, by the signal handler of the computing device, the user-defined task.

In another aspect of the invention, there is a computer program including a computer readable storage medium having program instructions embodied therewith. The program instructions are executable by a computing device to cause the computing device to: determine objects of interest designated by a user; split a first subset of a predetermined memory heap into guarded regions based on a number of objects of interest; allocate each of the objects of interest to a respective one of the guarded regions and remaining objects to a second subset of the predetermined memory heap; execute a program; detect one of the objects of interest is loaded from one of the guarded regions during the execution of the program; generate a trap that transfers control of the execution of the program to a signal handler, wherein the signal handler is designated to perform a user-defined task associated with the one of the objects of interest; and execute, by the signal handler, the user-defined task.

In another aspect of the invention, there is a system including: a processor, a computer readable memory and a computer readable storage medium associated with a computing device; program instructions to determine objects of interest designated by a user; program instructions to split a first subset of a predetermined memory heap into guarded regions based on a number of objects of interest; program instructions to allocate each of the objects of interest to a respective one of the guarded regions and remaining objects to a second subset of the predetermined memory heap; program instructions to execute a program; program instructions to detect one of the objects of interest is loaded from one of the guarded regions during the execution of the program; program instructions to generate a trap that transfers control of the execution of the program to a signal handler, wherein the signal handler is designated to perform a user-defined task associated with the one of the objects of interest; and program instructions to execute, by the signal handler, the user-defined task. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
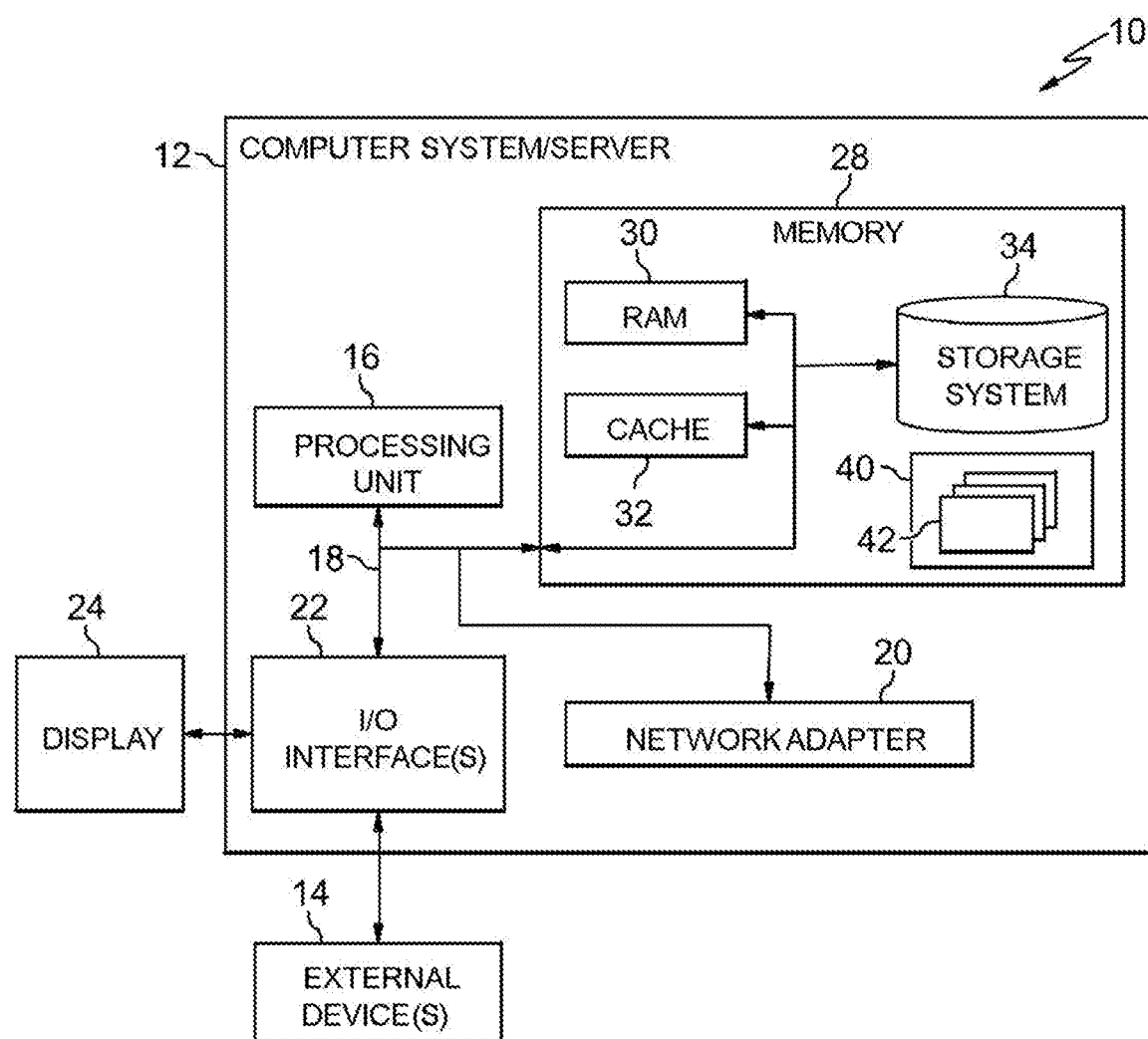
FIG. 1 depicts a computing infrastructure according to an embodiment of the present invention.

The present invention relates generally to object introspection and, more particularly, to object load introspection using guarded storage. In embodiments, systems and methods of the present invention provide for user-defined introspection of objects at runtime using guarded regions of a memory heap to trigger respective user-defined signal handlers. In aspects, a computer-implemented process for object load introspection using guarded storage includes, in response to splitting a subset of a predetermined memory heap into a predetermined number of regions, allocating each region in the predetermined number of regions to only one type of a user-specified object while allocating a remainder of the predetermined memory heap for all other objects. In aspects, the process further includes: modifying loads of object references to use guarded load instructions; defining a set of user-defined tasks to perform when an object of interest is loaded; guarded regions in the predetermined number of regions using a guarded storage facility; in response to detecting the object of interest is loaded from a guarded region, generating a trap that transfers control to a signal handler performing the set of user-defined tasks; performing a regular load; and returning execution back to a program that loaded the object of interest.

It is useful for software developers to determine how much memory is occupied by one or another object (e.g., Java object). The term object as used herein refers to a basic unit of object oriented programing representing real life entities. For example, a typical Java object comprises a state (e.g., attributes and properties of the object); a behavior (e.g., methods of the object and response of the object with other objects); and an identity (e.g., a unique name for the object enabling the object to interact with other objects). Object introspection can be utilized for profiling purposes or debugging purposes. The term object introspection (sometimes called reflection or type introspection) as used herein refers to the ability of a computing device to determine a type or properties of an object at runtime. For example, in programming languages that have a managed runtime (e.g., Java), a software programmer may desire object level introspection, either for profiling purposes or for debugging purposes. For profiling purposes, a programmer may wish to count how often a reference to a particular user-defined type of object is loaded, for example. In the case of debugging, a developer may wish to validate that an object's invariant properties are not broken, or that the object has not been corrupted, for example.

Programing objects typically point to or reference other objects. One way of viewing relationships between objects is through the use of an object graph. In order to improve or develop software code, programmers may use static analysis of an object graph. Alternatively, dynamic analysis of objects may be utilized, wherein a developer can determine which references are utilized during execution of a program. In managed runtime environments, a virtual machine (VM), and consequently a Just-In-Time (JIT) compiler, can check at run time whether an object is of a type a user wishes to profile, and if it is, the VM can trigger user-defined task. However, such a solution requires runtime checks for all object loads indiscriminately, resulting in an increased path length even for the majority of objects that the user does not wish to profile. In particular, when an object of interest is frequently used, counting the loading events of the object of interest utilizing the JIT compiler can significantly slow down execution of the associated program. Thus, this solution results in a large overhead.

Advantageously, embodiments of the present invention provide a mechanism to run user-defined tasks when an object of interest is loaded, without adding overhead. In aspects, in conjunction with a garbage collector (GC), specific object types are migrated into a guarded region, which allows for user-defined introspection, without having to restart a VM. Accordingly, embodiments of the invention provide a technical solution to the technical problem of undesirable overhead and slow-down during object introspection. Thus, embodiments improve the functioning of computing systems (e.g., lower overhead costs during program execution). Moreover, embodiments of the invention constitute improvements in the field of software programing, by providing unconventional introspection steps during runtime to obtain introspection data for objects of interest to a user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
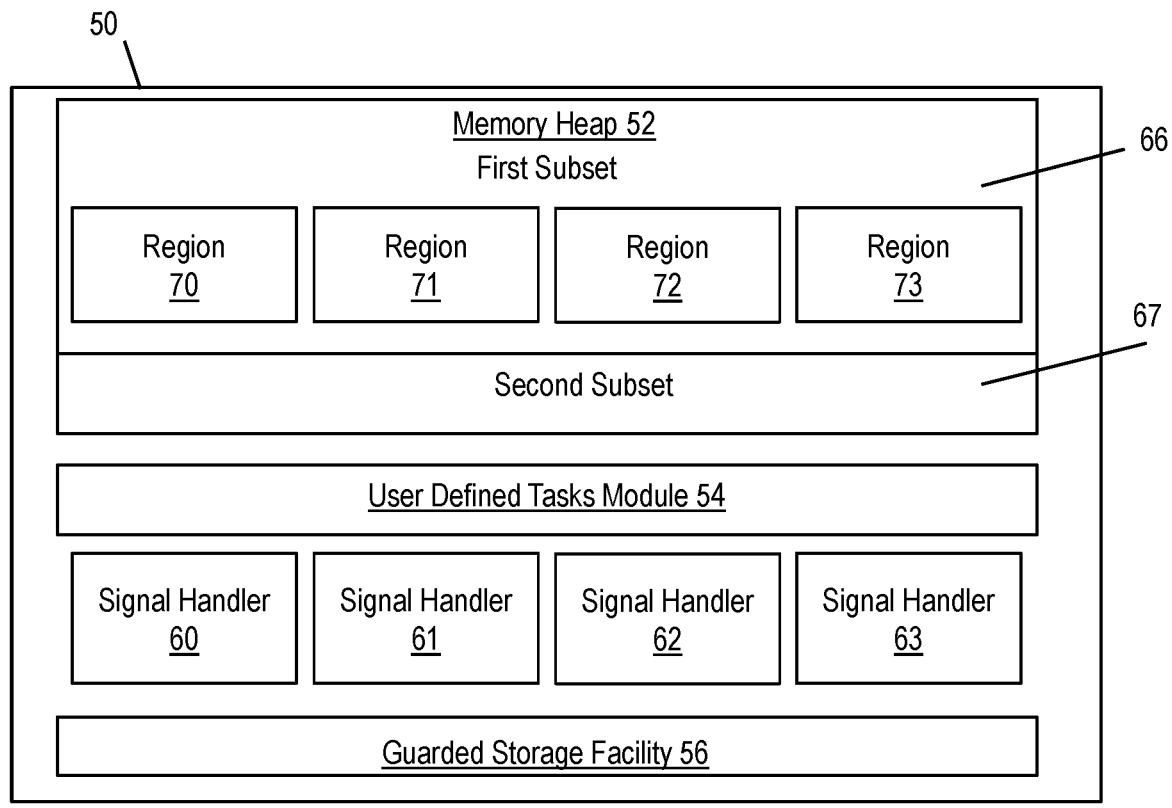
FIG. 2 shows an exemplary environment in accordance with aspects of the invention.

FIG. 2 shows an exemplary environment in accordance with aspects of the invention. In embodiments, the environment includes a server 50 having a memory heap 52, a user-defined tasks module 54, a guarded storage facility 56 and one or more signal handlers represented at 60-63. In embodiments, the server 50 comprises one or more components of the computing device 12, and may be a mainframe. In aspects, the server 50 includes a first subset 66 of the memory heap 52, and a second subset 67 of the memory heap 52. In embodiments, the environment of FIG. 2 is a Java environment, or other similar managed runtime environment. For example, in implementations, the memory heap 52 is a memory heap in a Java virtual machine (JVM). The term memory heap 52 (heaps) as used herein refers to an area of memory used for dynamic allocations; meaning that blocks of memory can be allocated and freed in an arbitrary order and accessed multiple times (as opposed to a stack memory, which is Last-In-First-Out). In aspects, garbage collections run on the memory heap 52 to free the memory used by objects that are no longer used.

In implementations, the server 50 includes one or more programing modules (e.g., program module 42 of FIG. 1) configured to be executed by the server 50 and perform functions described herein. In embodiments, the user-defined tasks module 54 of the server 50 is configured to receive and store user-defined tasks associated with a particular object type of interest to a user.

The term guarded storage facility 56 as used herein refers to a feature of the server 50 that allows a program to guard regions in memory such that performing a guarded load of a reference to that guarded region triggers a user-defined signal handler (e.g., signal handlers 60-63). In aspects, the guarded storage facility 56 is configured to enable enterprise scale Java applications to run with shorter periodic pauses. In embodiments, the guarded storage facility 56 is in a mainframe (e.g., server 50) configured to allow users to guard a contiguous region of memory (e.g., memory heap 52).

In aspects, the term signal handler as used herein (e.g., signal handlers 60-63) refers to a function that is called by a target environment when a corresponding signal occurs. The target environment suspends execution of a program until the signal handler returns or calls. In aspects, signal handlers 60-63 are designated to perform a set of user-defined tasks.

In embodiments, the server 50 includes additional or fewer components than those shown in FIGS. 1 and 2. In embodiments, separate components are integrated into a single computing component or module. Additionally, or alternatively, a single component may be implemented as multiple computing components or modules.

Figure 3:
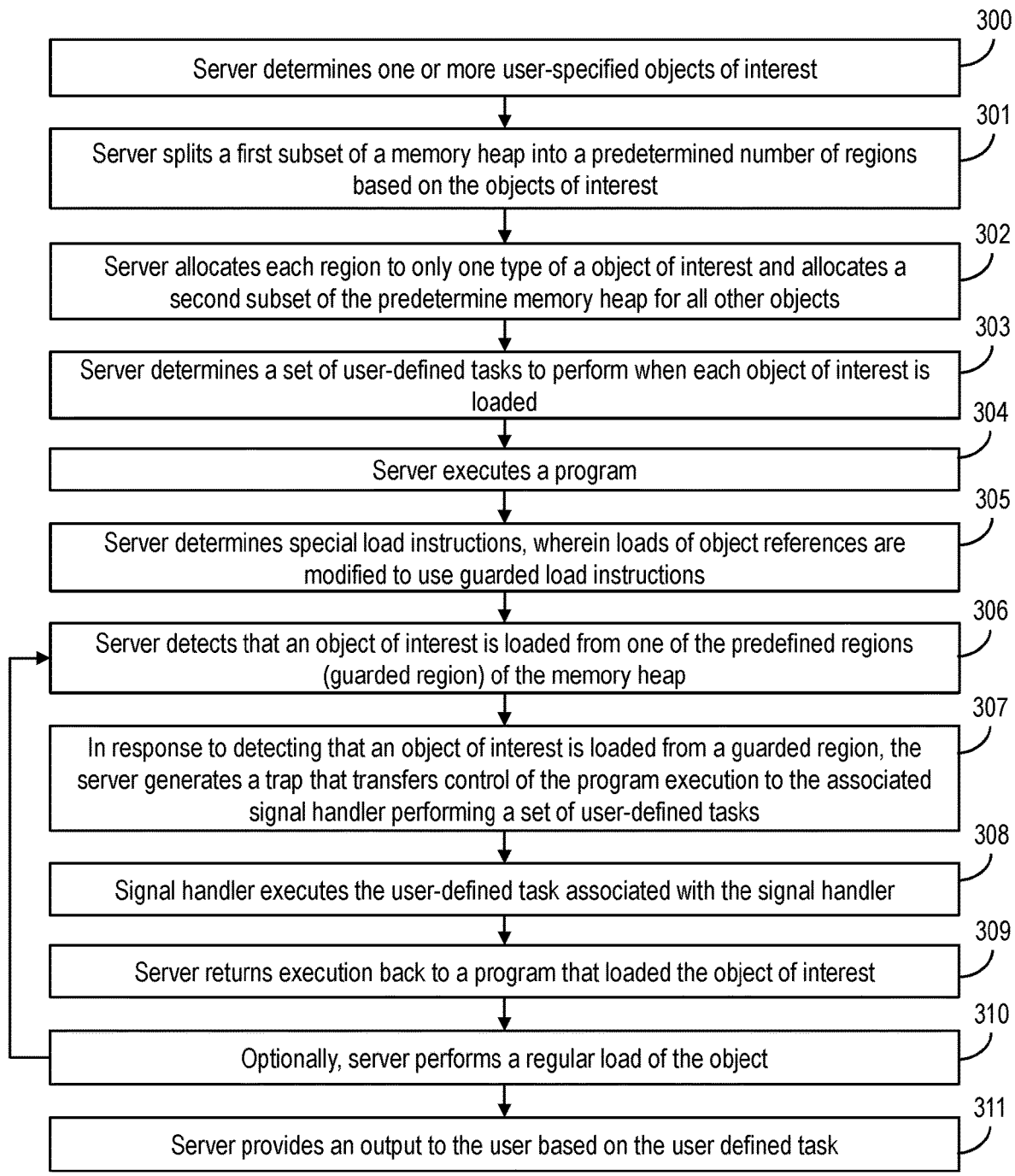
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300, the server 50 determines one or more user-specified objects of interest (hereafter objects of interest). In implementations of the invention, a user utilizes a user interface (e.g., Input/Output (I/O) interfaces 22 of FIG. 1) of the server 50 to indicate objects that are of interest to the user, and a user-defined tasks module 54 of the server 50 recognizes and stores the objects of interest. In embodiments, the user-defined objects of interest are in the form of a type or class of object. As noted above, the term object as used herein refers to a basic unit of object oriented programing representing real life entities. For example, a typical Java object comprises a state (e.g., attributes and properties of the object); a behavior (e.g., methods of the object and response of the object with other objects); and an identity (e.g., a unique name for the object enabling the object to interact with other objects).

At step 301, the server 50 splits the first subset 66 of the memory heap 52 into a predetermined number of guarded regions 70-73 based on the objects of interest. In implementations, the server 50 splits a predetermined memory heap 52 into a number of guarded regions 70-73 corresponding to the number of objects of interest determined at step 300, wherein one guarded region 70-73 is created for every object of interest. For example, determining four (4) objects of interest would result in four (4) guarded regions (e.g., guarded regions 70-73). Thus, in embodiments, a user can specify more than one type of object to profile. In aspects, the remainder of the memory heap 52 (the second subset 67) is utilized for all other objects (i.e., objects which are not identified as objects of interest). In implementations, the guarded regions 70-73 are guarded using the guarded storage facility 56. Software programmers may utilize memory allocation tools in the implementation of step 301.

At step 302, the server 50 allocates each guarded region 70-73 to only one type of object of interest, and allocates all remaining objects to the second subset of the memory heap 52. For example, a first type of object of interest is associated with guarded region 70, a second type of object of interest is associated with guarded region 71, etc.

At step 303, the server 50 determines a set of user-defined tasks to perform when each object of interest is loaded. In implementations of the invention, a user utilizes a user interface (e.g., Input/Output (I/O) interfaces 22 of FIG. 1) of the server 50 to indicate tasks to be performed for each of the objects of interest determined at step 300. Tasks to be performed may include, for example, a task of determining which object fields are accessed most frequently, a task to count how many times an object of interest is loaded, or any other task which provides a software developer or programmer with program profiling data. Software programing tools for defining tasks may be utilized in the implementation of step 303.

At step 304, the server 50 executes a program. In implementations, the program is a program of interest to a software developer or programmer who defined the objects of interest. In embodiments, program execution is performed in a Java environment. Program execution tools may be utilized by the server 50 in the performance of step 304.

At step 305, the server 50 determines special load instructions, whereby loads of object references are modified to use guarded load instructions. In aspects, the guarded load instructions include an address corresponding to one of the guarded regions 70-73. In implementations, when a thread (i.e., a sequence of programmed instructions) loads a value using a guarded load instruction, the server 50 is able to determine if control of the program execution should be transferred to a user-defined signal handler 60-63. In embodiments, metadata in a thread allows the guarded storage facility 56 to run the thread.

At step 306, the server 50 detects that an object of interest is loaded from one of the predefined guarded regions 70-73 of the memory heap 52. In embodiments, the server 50 determines, when a thread loads a value using a guarded load instruction, if the value is a reference within a range of references associated with a guarded region 70-73, and if it is, the server 50 recognizes that an object of interest has loaded. In aspects, the server 50 determines if an address from which an object loads is within a range specified for guarded regions 70-73, and if it is, the server 50 recognizes that an object of interest has loaded.

At step 307, the server 50 traps and transfers control of the program execution to an associated user-defined signal handler 60-63, based on detecting that the object of interest is loaded from one of the guarded regions 70-73 at step 306. For example, upon determining that an object of interest has loaded from guarded region 70, the server 50 traps and transfers control of the program execution to the signal handler 60, which is configured to perform the task associated with the object of interest from guarded region 70. In implementations, all loads from the guarded regions 70-73 necessarily result in the hardware (server 50) generating a trap which transfers control to the appropriate signal handler 60-63.

At step 308, the signal handler (e.g., 60), to which control was transferred at step 307, executes the user-defined task or tasks associated with the signal handler (e.g., 60). For example, the signal handler 60 may execute tasks associated with counting the loads of a particular object type (object of interest).

At step 309, the signal handler (e.g., 60) of step 308 returns control of the program execution back to the program. In embodiments, a regular load of the object of interest is performed by the program, regardless of step 308. The term regular load as used herein refers to a load that just loads some data from an address specified. In implementations, a guarded load also loads some data from the address specified, but before it does, it checks whether the address is within a guarded range; if it is, then the hardware (server 50) initiates a trap according to step 307. It should be understood that if no trap is initiated at step 307, execution of the program continues as if the load instruction were a "regular load" instruction. In alternative embodiments, the transferring of the control to the signal handler step 307 interferes with the regular loading of the object of interest.

Optionally, at step 310, the server 50 performs a regular load of the object of interest before control of the execution is returned to the program at step 309. Accordingly, in implementations where the handling of the object of interest by the signal handler (e.g., 60) at step 308 interferes with regular loading of the object of interest, the server 50 can complete the load at step 310.

At step 311, the server 50 provides an output to the user based on the user-defined tasks executed at step 308. It should be understood that, in embodiments, steps of FIG. 3 (e.g., steps 306-310) are repeated to generate aggregated data (e.g., profile data of an object of interest), which the server 50 may format as an output for a user's consumption. In one example, the server 50 provides a user with information regarding the distribution of lengths of strings as an output. In another example, the server 50 provides the user with a histogram of aggregated data gathered during implementations of step 308.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for object load introspection using guarded storage. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    determining, by a computing device, objects of interest designated by a user, wherein the objects of interest comprise basic units of object oriented programming;
    splitting, by the computing device, a first subset of a predetermined memory heap into guarded regions based on a corresponding number of objects of interest, wherein the predetermined memory heap comprises an area of memory used for dynamic allocations;
    allocating, by the computing device, each of the objects of interest to a respective one of the guarded regions and remaining objects to a second subset of the predetermined memory heap;
    executing, by a computing device, a program;
    detecting, by the computing device, one of the objects of interest of the program is loaded from one of the guarded regions of the predetermined memory heap;
    generating, by the computing device, in response to detecting the one of the objects of interest of the program is loaded from one of the guarded regions of the predetermined memory heap, a trap that transfers control of the executing the program to a signal handler, wherein the signal handler is designated to perform a user-defined object introspection task associated with the one of the objects of interest;
    executing, by the signal handler of the computing device, the user-defined object introspection task; and
    performing, by the computing device, a regular load of the object of interest.

2. The computer-implemented method of claim 1, wherein the executing the program occurs in a Java environment.

3. The computer-implemented method of claim 1, further comprising determining, by the computing device, user-defined object introspection tasks associated with each of the objects of interest, including the user-defined object introspection task associated with the one of the objects of interest, wherein each of the user-defined object introspection tasks is configured to be performed when an associated object of interest is loaded.

4. The computer-implemented method of claim 1, further comprising determining, by the computing device, guarded load instructions, wherein loads of references of the objects of interest are modified to use the guarded load instructions.

5. The computer-implemented method of claim 1, further comprising returning the executing the program to the program that loaded the one of the objects of interest.

6. The computer-implemented method of claim 1, further comprising providing, by the computing device, an output to the user based on the user-defined object introspection task.

7. A computer program product comprising a computer readable storage medium having program instructions embodied therewith, the program instructions executable by a computing device to cause the computing device to:
   determine objects of interest designated by a user, wherein the objects of interest comprise basic units of object oriented programming;
   split a first subset of a predetermined memory heap into guarded regions based on a corresponding number of objects of interest, wherein the predetermined memory heap comprises an area of memory used for dynamic allocations;
   allocate each of the objects of interest to a respective one of the guarded regions and remaining objects to a second subset of the predetermined memory heap;
   execute a program;
   detect one of the objects of interest of the program is loaded from one of the guarded regions of the predetermined memory heap during the execution of the program;
   generate, in response to detecting the one of the objects of interest of the program is loaded from one of the guarded regions of the predetermined memory heap, a trap that transfers control of the execution of the program to a signal handler, wherein the signal handler is designated to perform a user-defined object introspection task associated with the one of the objects of interest;
   execute, by the signal handler, the user-defined object introspection task; and
   perform a regular load of the object of interest.

8. The computer program product of claim 7, wherein the program instructions further cause the computing device to determine user-defined object introspection tasks associated with each of the objects of interest, including the user-defined object introspection task associated with the one of the objects of interest, wherein each of the user-defined object introspection tasks is configured to be performed when an associated object of interest is loaded, and each of the objects of interest is a Java object.

9. The computer program product of claim 7, wherein the program instructions further cause the computing device to determine guarded load instructions, wherein loads of references of the objects of interest are modified to use the guarded load instructions.

10. The computer program product of claim 7, wherein the program instructions further cause the computing device to return the execution of the program to the program that loaded the one of the objects of interest.

11. The computer program product of claim 7, wherein the program instructions further cause the computing device to provide an output to the user based on the user-defined object introspection task.

12. A system comprising:
   a processor, a computer readable memory and a computer readable storage medium associated with a computing device;
   program instructions to determine objects of interest designated by a user, wherein the objects of interest comprise basic units of object oriented programming;
   program instructions to split a first subset of a predetermined memory heap into guarded regions based on a corresponding number of objects of interest, wherein the memory heap comprises an area of memory used for dynamic allocations;
   program instructions to allocate each of the objects of interest to a respective one of the guarded regions and remaining objects to a second subset of the predetermined memory heap;
   program instructions to execute a program;
   program instructions to detect one of the objects of interest of the program is loaded from one of the guarded regions of the predetermined memory heap during the execution of the program;
   program instructions to generate, in response to detecting the one of the objects of interest of the program is loaded from one of the guarded regions of the predetermined memory heap, a trap that transfers control of the execution of the program to a signal handler, wherein the signal handler is designated to perform a user-defined object introspection task associated with the one of the objects of interest;
   program instructions to execute, by the signal handler, the user-defined object introspection task; and
   program instructions to perform a regular load of the object of interest,
   wherein the program instructions are stored on the computer readable storage medium for execution by the processor via the computer readable memory.

13. The system of claim 12, further comprising program instructions to determine user-defined tasks associated with each of the objects of interest, including the user-defined task associated with the one of the objects of interest, wherein each of the user-defined object introspection tasks is configured to be performed when an associated object of interest is loaded.

14. The system of claim 12, further comprising program instructions to determine guarded load instructions, wherein loads of references of the Java objects of interest are modified to use the guarded load instructions.

15. The system of claim 13, further comprising program instructions to return the execution of the program to the program that loaded the one of the objects of interest.

16. The system of claim 13, further comprising program instructions to provide an output to the user based on the user-defined object introspection task.

17. The system of claim 16, wherein the output comprises aggregated profile data regarding the one of the objects of interest.

* * * * *